United States Patent

Lim et al.

[11] Patent Number: 5,781,621
[45] Date of Patent: Jul. 14, 1998

[54] MICROCONTROLLER WITH A CALLER IDENTIFICATION UNIT

[75] Inventors: Cher Eng Lim; Tiong Kee Chua; Satinder Jit Singh Sohi; Luen Hin Kwok, all of Singapore, Singapore

[73] Assignee: Motorola, Inc., Schaumburg, Ill.

[21] Appl. No.: 603,844

[22] Filed: Feb. 22, 1996

[30] Foreign Application Priority Data

Mar. 17, 1995 [SG] Singapore .................... 9500118-6

[51] Int. Cl.⁶ .................... H04M 1/56; H04M 15/06
[52] U.S. Cl. .................... 379/142; 379/376; 375/334
[58] Field of Search .................... 379/93, 95, 96, 379/140, 142, 199, 201, 376; 375/334, 335, 336, 337; 341/143, 155

[56] References Cited

U.S. PATENT DOCUMENTS

| 4,924,496 | 5/1990 | Figa et al. | 379/142 |
| 5,054,052 | 10/1991 | Nonami | 379/142 |
| 5,341,411 | 8/1994 | Hashimoto | 379/142 |
| 5,343,516 | 8/1994 | Callele et al. | 379/142 |
| 5,512,898 | 4/1996 | Norsworthy et al. | 341/155 |

OTHER PUBLICATIONS

Pp. 2–313, 2–771, 2–772, 2–773, 3–5 and 3–6 from Motorola's Communications Device Data book.

Primary Examiner—Curtis Kuntz
Assistant Examiner—Paul Loomis

[57] ABSTRACT

A microcontroller (100) for processing caller information received from a telephone line to display on a display panel of a telecommunication device. The microcontroller (100) includes a central processing unit (160), a display control unit (110) for controlling the display panel, a ring detector (140), a carrier detector (150) for detecting the caller information, memory (120) for storing a plurality of predetermined control parameters, and a caller identification unit (130) for providing the caller information to the display control unit (110). Within the caller identification unit (130), a power management (134) unit controls a power supply (170) to a signal demodulator (132), based on the plurality of predetermined control parameters, to process the caller information. Of the plurality of predetermined control parameters, a first control parameter enables the power supply and a second control parameter disables the power supply (170) to the signal demodulator (132).

9 Claims, 2 Drawing Sheets

- PRIOR ART -

MICROCONTROLLER WITH A CALLER IDENTIFICATION UNIT

FIELD OF THE INVENTION

This invention relates in general to integrated circuits used in telecommunication devices and in particular to a microcontroller supporting caller identification features in a telecommunication device.

BACKGROUND OF THE INVENTION

Conventionally, electronic devices operate with control units known as microcontrollers. Fabricated on a silicon chip as an integrated circuit (IC), the microcontroller typically processes digital signals. Hence, electronic devices receiving analog signals as inputs need to convert such analog signals to digital signals before subsequent processing by the microcontroller.

One example of an electronic device operating with analog signals as inputs are telecommunication devices such as telephones and facsimile machines. Typically, analog circuitry within a telecommunication device couples to an interface for converting analog signals, received on a telephone line, to digital signals. In the art, this interface is known as a signal demodulator.

Analog signals received on a telephone line includes data such as caller information identifying the calling party sending the data. In the art, caller identification ICs are available for decoding the caller information. Within the caller identification ICs, the caller information is converted by a signal demodulator to a digital format. Thereafter, the caller identification, in a digital format, is then used within the telecommunication device for subsequent processing.

Signal demodulators within caller identification ICs typically use analog switched capacitor filtering and, therefore, as is known in the art, have low immunity to power noise. This low immunity to power noise further limits such signal demodulators from processing analog signals received on noisy telephone lines. As a result, the analog signals may not be processed, or may even be wrongly processed, by a signal demodulator that uses analog switched capacitor filtering.

Thus, a need exists for a microcontroller, having a caller identification unit, for a telecommunication device to have good immunity to power noise and, thereby, perform signal processing reliably. Furthermore, the microcontroller needs to also operate efficiently with low power consumption because many telecommunication devices are portable and operated with batteries that have limited power.

SUMMARY OF THE INVENTION

A microcontroller for processing caller information received from a telephone line to display on a display panel of a telecommunication device. The microcontroller comprises a central processing unit for processing data, a display control unit for controlling the display panel, a parameter memory within the central processing unit for storing a plurality of predetermined control parameters, a ring detector for detecting a plurality of rings on the telephone line wherein the plurality of rings includes a first ring, a carrier detector for detecting the caller information, and a caller identification unit for providing the caller information to the display control unit. The caller identification unit comprises a signal demodulator for processing the caller information, a power supply for the signal demodulator, and a power management unit within the central processing unit for controlling the power supply based on the plurality of predetermined control parameters.

DETAILED DESCRIPTION OF THE INVENTION

Figure 1:
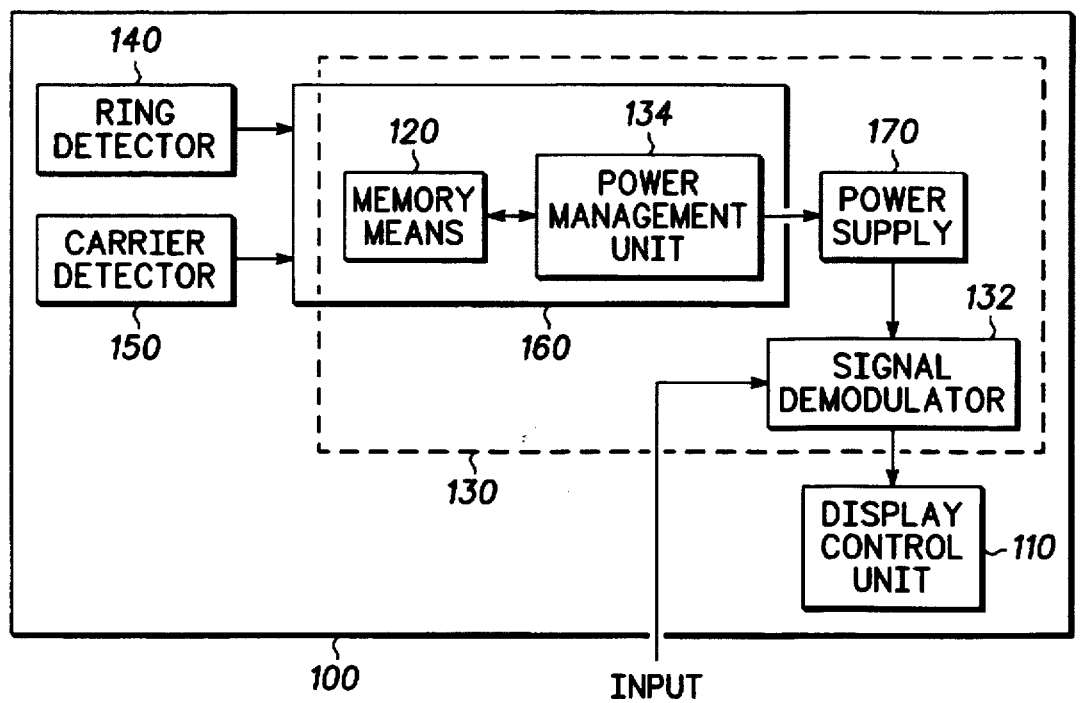
FIG. 1 is a block diagram of a microcontroller in accordance with a preferred embodiment of the present invention.

In accordance with a preferred embodiment of the present invention, FIG. 1 shows a microcontroller 100 for processing caller information received from a telephone line to display on a display panel of a telecommunication device. The microcontroller 100 comprises a display control unit 110, a central processing unit 160 for processing data, memory means 120 within the central processing unit 160, a ring detector 140, a carrier detector 150, , and a caller identification unit 130. Within the caller identification unit 130, a signal demodulator 132 processes the caller information and provides data output identifying the calling party to the display control unit 110.

Figure 2:
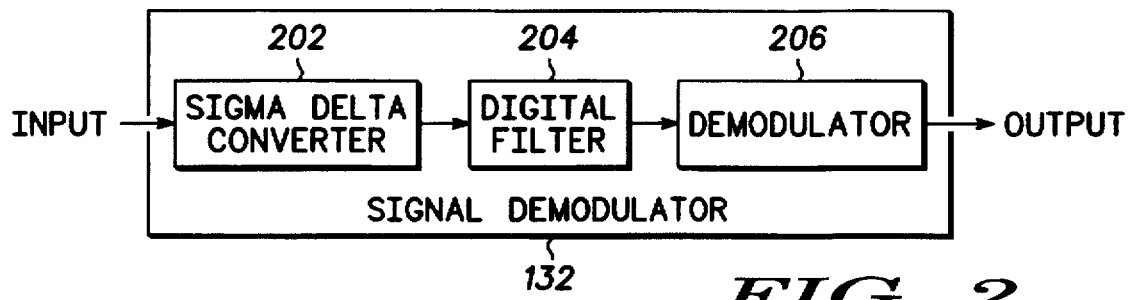
FIG. 2 is a block diagram of a signal demodulator within the microcontroller of FIG. 1 in accordance with the preferred embodiment of the present invention.

In accordance with the preferred embodiment of the present invention, FIG. 2 shows a block diagram of the signal demodulator 132 of FIG. 1. Comprising a sigma delta convertor 202, a digital filter 204, and a demodulator 206, the signal demodulator 132 receives the caller information in an analog format as an input for the sigma delta convertor 202. Output from the signal demodulator 132 is a digital baseband signal from the demodulator 206.

Figure 3:
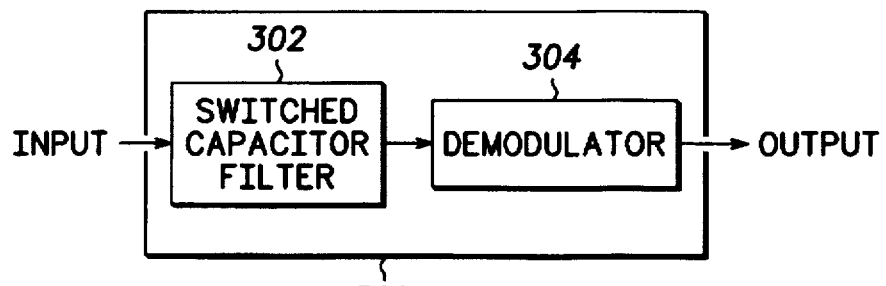
FIG. 3 is a block diagram of a prior art signal demodulator.

Integrated into the microcontroller 100, the signal demodulator 132 of the present invention advantageously eliminates the need for an independent signal demodulator 132 to interface with the microcontroller 100. Furthermore, unlike an analog switched capacitor filter 302 used, for example, in a prior art signal demodulator 300 shown in FIG. 3, the signal demodulator 132 in the present invention effectively applies digital signal processing to convert the caller information from the analog format to the digital baseband signal. As is known in the art, digital signal processing has a better power noise immunity and can, therefore, tolerate a higher level of noise typical of signals received from noisy telephone lines.

In accordance with the preferred embodiment of the present invention, he sigma delta convertor 202 receives the caller information from the telephone line and converts the caller information to a two-level quantized digital format. From this two-level quantized digital format, the caller information is passed through the digital filter 204 for noise filtering. Thereafter, the demodulator 206 demodulates the caller information to the digital baseband signal.

FIG. 1 also shows a power management unit 134 within the central processing unit 160 for controlling a power supply 170 to the signal demodulator 132 in accordance with the preferred embodiment of the present invention. Coupling to the power supply 170 for the signal demodulator 132, the power management unit 134 enables or disables the operations of the signal demodulator 132 based on a plurality of predetermined control parameters stored in the memory means 120. In accordance with the preferred embodiment of the present invention, the memory means 120 comprises a parameter memory within the central processing unit 160.

Caller information in conventional telephone signaling protocols is transmitted on the telephone line within the time period between a first ring and a second ring. Typically, this time period between the first ring and the second ring is more than sufficient to transmit all the caller information. Such conventional telephone signaling protocols also define the caller information to include an indication of the size of the caller information, for example, a number of data bytes of caller information.

Figure 4:
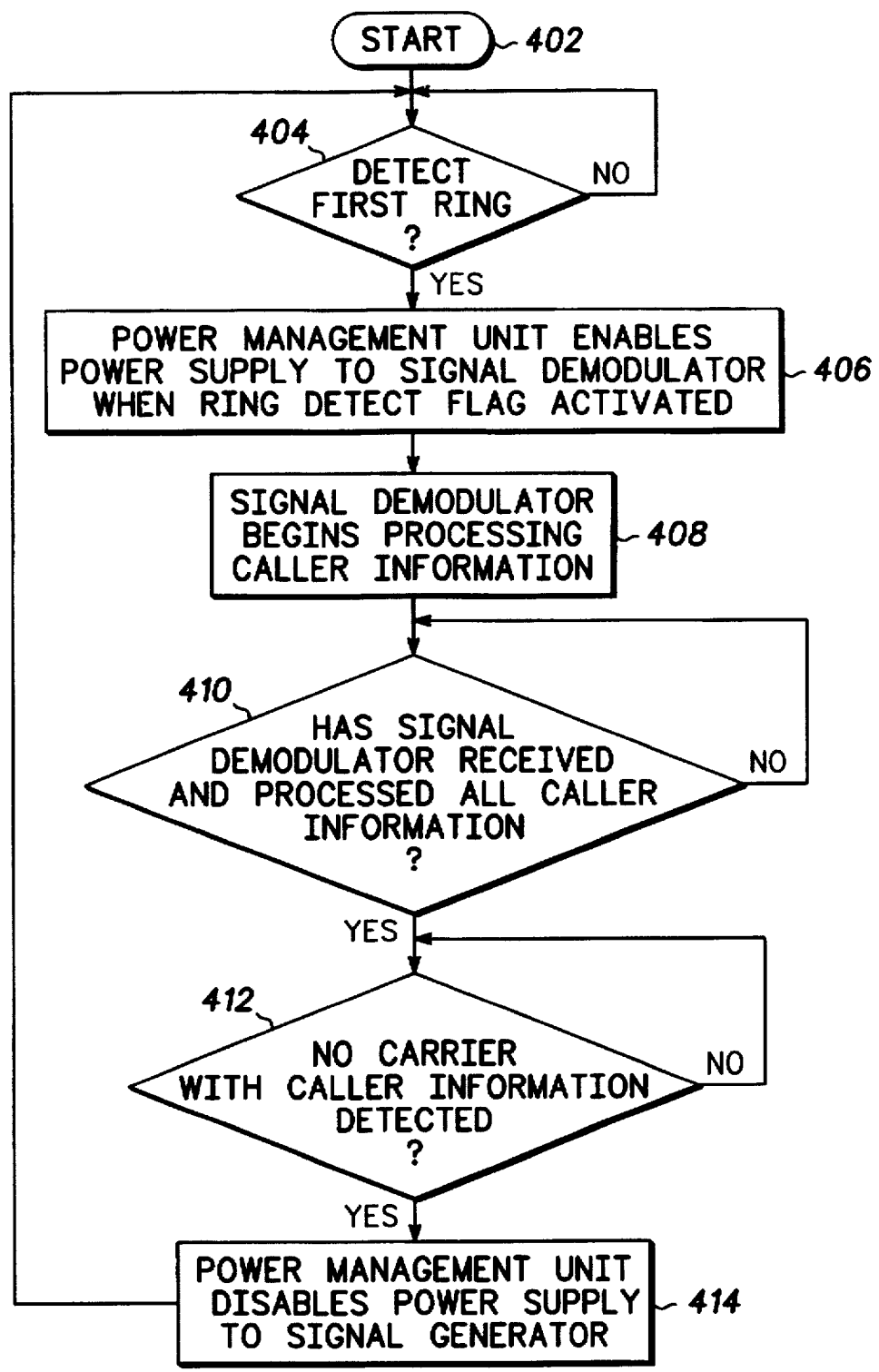
FIG. 4 is flow diagram of a method for controlling a power supply to the signal demodulator of FIG. 2 in accordance with the preferred embodiment of the present invention.

In accordance with the preferred embodiment of the present invention, FIG. 4 shows a method 400 for controlling the power supply 170 to the signal demodulator 132 by the power management unit 134. The method 400 begins at step 402 and proceeds to detect the first ring 404, by the ring detector 140, on the telephone line. When the ring detector 140 does not detect the first ring 404, the caller identification unit 130 will continue to monitor the telephone line to detect the first ring 404. Based on the plurality of predetermined control parameters stored in the memory means 120, the power management unit 134 controls the power supply 170 to the signal demodulator 132. In accordance with the preferred embodiment of the present invention, a first control parameter of the plurality of predetermined control parameters is activation of a ring detect flag when the ring detector 140 detects the first ring. With the first control parameter activated, the power management unit 134 enables 406 the power supply 170 to the signal demodulator 132. Thereafter, the signal demodulator 132 begins processing the caller information 408 according to the number of data bytes of caller information as indicated within the caller information. When processing the caller information 408, the microcontroller 100 checks whether the signal demodulator 132 has received and processed all the caller information 410. Upon determining that all the caller information is received and is processed by the signal demodulator 132, the microcontroller 100 further checks a second control parameter of the plurality of predetermined control parameters. In accordance with the preferred embodiment of the present invention, the second control parameter is activation of a no carrier detect flag when the carrier detector 150 does not detect a carrier with caller information 412 on the telephone line. With activation of the second control parameter, the power management unit 134 disables 414 the power supply 170 to the signal demodulator 132.

The present invention advantageously controls the power supply 170 to the signal demodulator 132 with the power management unit 134 and provides an improved method to save on power during periods when no caller information is available. In addition, the digital implementation of the signal demodulator 132 as part of the caller identification unit 130 and its integration with a microcontroller 100 provide substantial cost savings of the present invention over the prior art signal demodulator 300 coupled to a separate microcontroller (not shown).

Such improvements to the microcontroller 100, integrated with the caller identification unit 130, ensures that portable battery-powered telecommunication devices consume power efficiently to remain operable longer. Furthermore, the digital implementation of the caller identification unit 130 makes the microcontroller 100 easier to fabricate with different process technologies compared with the prior art signal demodulator 300 that will require customizing to meet varying analog design parameters and manufacturing capabilities. An integrated microcontroller, such as the microcontroller 100 of the present invention, has fewer external components and, hence, reduces the cost of a telecommunication device.

By now it should be appreciated that there has been provided a method and apparatus to process caller information received on a telephone line by the microcontroller 100 for a telecommunication device.

We claim:

1. In a microcontroller for a telecommunication device, a method for controlling a power supply to a signal demodulator of a caller identification unit within the microcontroller when the caller identification unit receives caller information from a telephone line wherein the microcontroller includes memory means, a ring detector, a carrier detector, and a display control unit, the method comprising the steps of:

detecting a first ring on the telephone line by the ring detector;

enabling the power supply to the signal demodulator by a power management unit within a central processing unit based on a first control parameter of a plurality of predetermined control parameters stored in the memory means;

thereafter, processing the caller information by the signal demodulator, based on a number of data bytes of caller information detected by the carrier detector, to provide the caller information to the display control unit; and disabling the power supply to the signal demodulator by the power management unit based on a second control parameter of the plurality of predetermined control parameters, wherein the second control parameter is provided by activation of a no carrier detect flag when the carrier detector does not detect a carrier with caller information.

2. The method of claim 1 wherein the step of enabling the power supply to the signal demodulator occurs with activation of a ring detect flag as the first control parameter.

3. A microcontroller for processing caller information received from a telephone line to display on a display panel of a telecommunication device, the microcontroller comprising:

a display control unit for controlling the display panel;

a ring detector for detecting a plurality of rings on the telephone line wherein the plurality of rings includes a first ring;

a carrier detector for detecting the caller information; and a caller identification unit for providing the caller information to the display control unit, the caller identification unit comprising:

a signal demodulator for processing the caller information;

a power supply for the signal demodulator; and a central processing unit for processing data, the central processing unit includes:

a parameter memory for storing a plurality of predetermined control parameters;

a power management unit for controlling the power supply based on the plurality of predetermined control parameters that includes a second control parameter for disabling the power supply, wherein the second control parameter is provided by activation of a no carrier detect flag when the carrier detector does not detect a carrier with caller information.

4. The microcontroller of claim 3 wherein the signal demodulator comprises:

a sigma delta convertor for converting the caller information from an analog format to a two-level quantized digital format;

a digital filter for noise filtering the caller information in the two-level quantized digital format; and a demodulator for demodulating the caller information received from the digital filter to a baseband signal.

5. The microcontroller of claim 3 wherein one of the plurality of predetermined control parameters is a first control parameter when a ring detect flag is activated for the power management unit to enable the power supply to the signal demodulator when the ring detector detects the first ring.

6. A telecommunication device operating with information received from a telephone line and having a display panel for displaying caller information to the telecommunication device comprising:

a microcontroller for processing the information to provide the caller information, the microcontroller comprising:

a display control unit for controlling the display panel;

a ring detector for detecting a plurality of rings on the telephone line wherein the plurality of rings includes a first ring;

a carrier detector for detecting the caller information; and a caller identification unit for providing the caller information, the caller identification unit comprising:

a signal demodulator for processing the caller information;

a power supply for the signal demodulator; and a central processing unit for processing the information, the central processing unit includes:

a parameter memory for storing a plurality of predetermined control parameters;

a power management unit for controlling the power supply based on the plurality of predetermined control parameters that includes a second control parameter for disabling the power supply, wherein the second control parameter is provided by activation of a no carrier detect flag when the carrier detector does not detect a carrier with caller information.

7. The telecommunication device of claim 6 wherein the signal demodulator comprises:

a sigma delta convertor for converting the caller information from an analog format to a two-level quantized digital format;

a digital filter for noise filtering the caller information in the two-level quantized digital format; and a demodulator for demodulating the caller information received from the digital filter to a baseband signal.

8. The telecommunication device of claim 6 wherein the memory means comprises a parameter memory within the central processing unit.

9. The telecommunication device of claim 6 wherein one of the plurality of predetermined control parameters is a first control parameter when a ring detect flag is activated for the power management unit to enable the power supply to the signal demodulator when the ring detector detects the first ring.

* * * * *